Patented Jan. 12, 1954

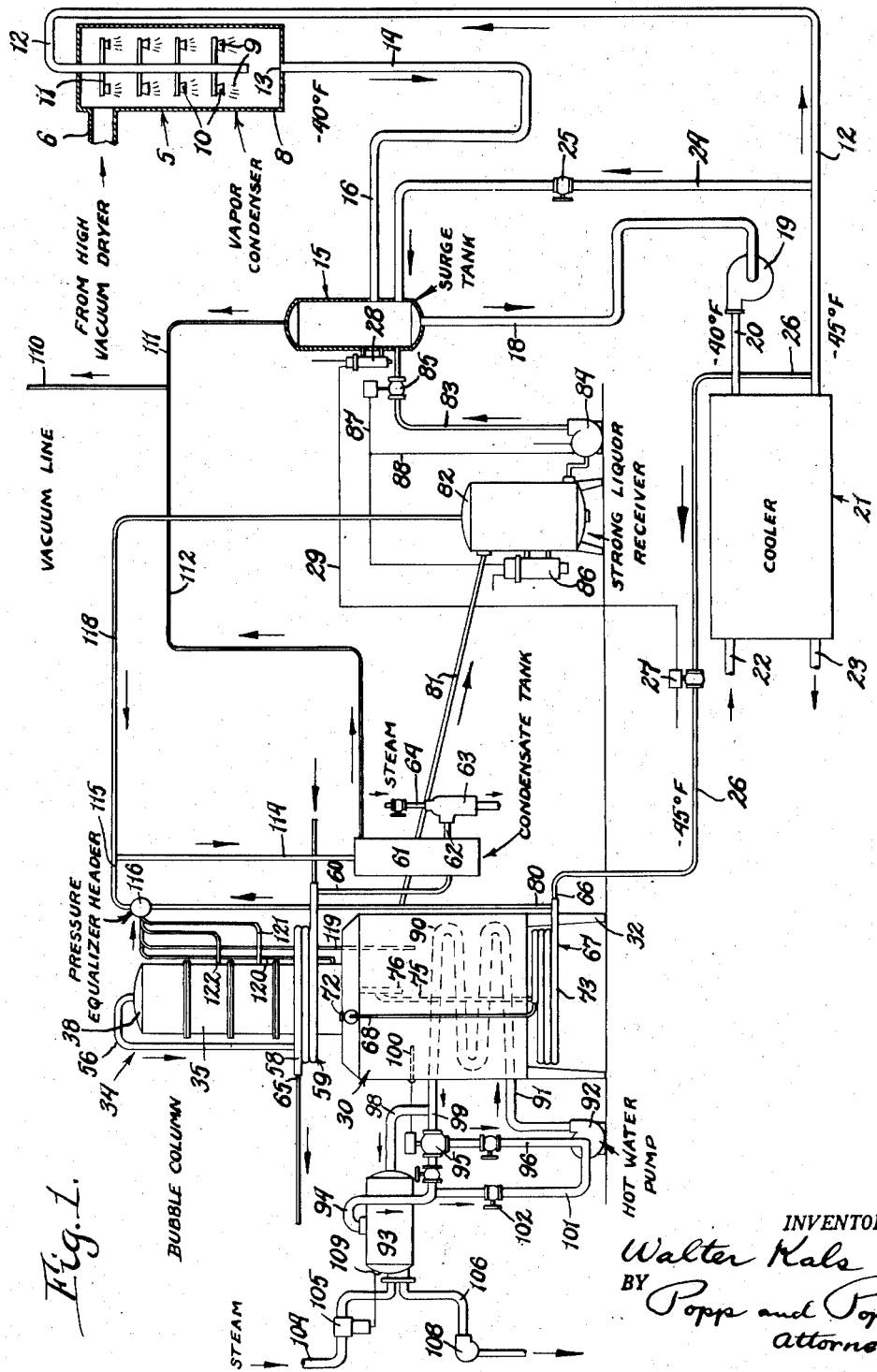

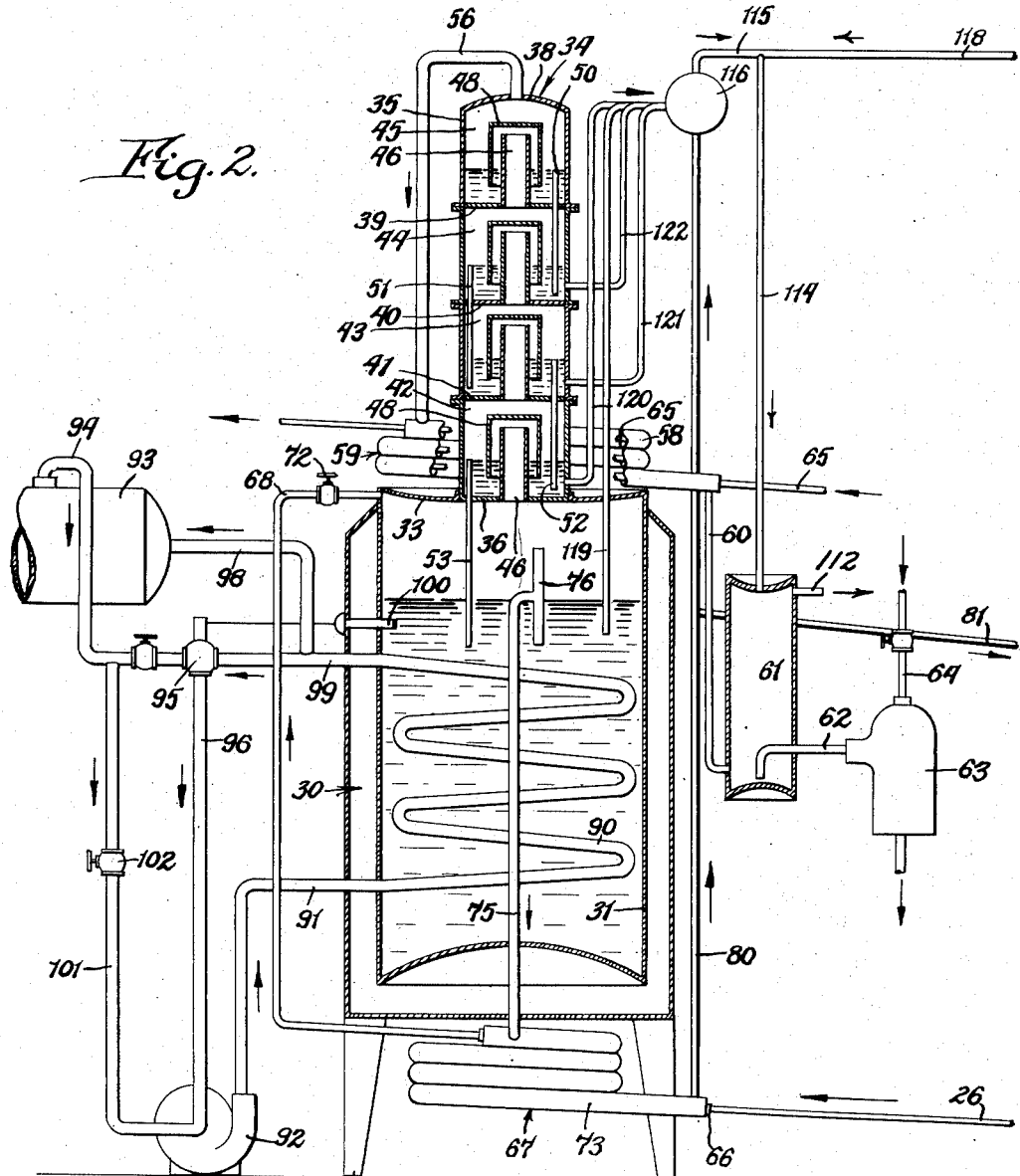

2,665,750

UNITED STATES PATENT OFFICE 2,665,750

VACUUM CONCENTRATOR

Walter Kals, New York, N. Y., assignor to Niagara Blower Company, New York, N. Y., a corporation of New York Application April 3, 1948, Serial No. 18,765

7 Claims. (Cl. 159—23)

This invention relates to a vacuum concentrator and more particularly to such a concentrator for use in conjunction with a vacuum dryer in which hygroscopic moisture is removed from heat sensitive materials by exposing the materials to a high vacuum or low absolute pressure.

Hygroscopic water can be removed from materials by exposing the materials in a vacuum dryer to a high vacuum at which the water will evaporate at moderate or low temperatures. The water vapor so evaporated must be continuously removed from the vacuum dryer, this being usually done by condensing the water vapor at extremely low temperatures. Such extremely low temperatures are necessary in order to maintain the low absolute pressure required in the vacuum dryer for removal of the hygroscopic moisture at the necessary moderate temperature. Thus, if water vapor is condensed at, say, 70° F., an absolute pressure of approximately 0.74 inch of mercury is the lowest that can be maintained in the vacuum dryer. If the condensing temperature is lowered to, say, 32° F., an absolute pressure of approximately 0.18 inch of mercury is the lowest that can be maintained in the vacuum dryer. Where lower absolute pressures are required in the vacuum dryer, lower condensing temperatures are required. Thus, with a condensing temperature of −40° F., an absolute pressure of approximately 0.0038 inch of mercury can be maintained in the vacuum dryer.

However, with such low condensing temperatures, it is apparent that the water vapor will freeze on a dry condensing surface. Hence, the use of such low temperature dry condensing surfaces requires the removal of ice either continuously by means of a mechanical scraper or intermittently by periodically shutting down the equipment for defrosting of the condensing surfaces. Both of these methods are subject to serious practical objections, the former in the difficulties necessarily attendant upon the mechanical removal of ice from condensing surfaces under high vacuum and the removal of the ice from the high vacuum zone and the latter in the changing heat transfer characteristics necessarily encountered as the condensing surfaces ice-up as well as the disadvantage of being required to shut down the apparatus at periodic intervals in order to defrost the condensing surface and remove the water from the vacuum zone.

It is also possible to condense the water vapor at the low absolute pressure required by contact with sprays of a liquid having a low freezing temperature and a vapor pressure preferably lower than that of water, such as lithium chloride brine maintained at the extremely low temperature required for condensation under an adequately high vacuum. By contacting water vapor with such a liquid supplied at a temperature of, say −45° F., the water vapor can be condensed at −40° F. thereby to permit of maintaining an absolute vapor pressure of approximately 0.0038 inch of mercury. The supply temperature of the spray liquid is determined by the temperature rise of this liquid in the condensing chamber to remove the latent heat of condensation. With the use of such sprays, the water condensed from the water vapor joins the spray liquid. The spray liquid is recirculated through a cooler to maintain its low temperature. It is necessary to continuously reconcentrate this spray liquid since otherwise it would be diluted by the condensate to a point where the spray liquid would freeze at the low temperatures required. The present invention is directed to a concentrator for maintaining a spray liquid at the required high concentration to function at the extremely low temperatures required to condense water vapor from a vacuum dryer maintained at a low absolute pressure in order to remove hygroscopic moisture from materials at moderate temperatures.

One of the objects of the present invention is to provide such a concentrator which will function continuously or intermittently to evaporate the required amount of vapor from the spray liquid to maintain it at the required concentration for operation as the condensing medium by direct contact with the vapor to be condensed at the low temperatures and pressures involved.

Another object is to provide such a concentrator which will return the reconcentrated spray liquid at a temperature only slightly higher than that to be maintained in the condensing chamber thereby to minimize the refrigeration required in operating the vacuum dryer.

Another object is to provide such a concentrator in which an excessively low absolute pressure is not required so that the boiled off waste can be condensed at above freezing temperature and the condensate ejected in an inexpensive manner.

Another object is to provide such a concentrator which can be so installed that its higher absolute pressure can be conveniently balanced against the low absolute pressure required in the spray chamber by means of a liquid leg of practicable height.

Another object is to provide such a concentrator in which the absolute pressure in all parts is balanced.

Another aim is to provide such a concentrator which operates with a minimum loss of the antifreeze component, such as lithium chloride, used in the spray liquid.

Another object is to provide such a concentrator which is smooth and trouble-free in its operation and which will stand up under conditions of severe and constant use without getting out of order or requiring repairs.

Other objects and advantages will appear from the following description and drawings in which Fig. 1 is a diagrammatic representation of a vacuum concentrator embodying the present invention and showing the same connected with the high vacuum vapor condenser of a low absolute pressure dryer.

Fig. 2 is a vertical section through the concentrating tank and bubble column forming part of the apparatus shown in Fig. 1.

The vacuum concentrator forming the subject of the present invention is shown as used in conjunction with the high vacuum vapor condenser 5 of a high vacuum dryer (not shown) in which the moisture of a hygroscopic material is removed at moderate temperatures under low absolute pressure. The high vacuum dryer connects with the vapor inlet 6 of the shell 8 of the high vacuum vapor condenser 5 and in this high vacuum vapor condenser the vapors from the high vacuum dryer contact with cold sprays 9 from the nozzles 10 on the branches 11 of a spray liquid pipe 12 which extends through the top of the shell 8. This spray liquid is in the form of an antifreeze solution of suitable characteristics and is supplied at a temperature of, say, —45° F. and escapes through an outlet pipe 13 at a temperature of, say, —40° F., so that the vapor from the inlet 6 is cooled to a temperature of approximately —40° F. thereby to permit of maintaining an absolute pressure of approximately 0.0038 inch of mercury in the vacuum dryer. This outlet pipe 13 is formed to provide a vertical U-shaped liquid leg 14 which provides a liquid seal between the vapor condenser 5 and a surge tank 15 to which the upper end of one branch of the vertical U-shaped leg 14 is connected by a horizontal pipe 16.

The spray liquid is withdrawn from the bottom of the surge tank 15 through a pipe 18 by a circulating pump 19, the outlet line 20 of which connects with a cooler 21 which can be in the form of a shell and tube cooler. In this shell and tube cooler the spray liquid is cooled to the assumed temperature of —45° F. and returned to the spray pipe 12 for recirculation to provide the sprays 10. The shell and tube cooler can be supplied with a cooling medium such as direct expanded refrigerant through a refrigerant inlet line 22 and a refrigerant outlet line 23 so as to effect the necessary reduction in temperature of the spray liquid to —45° F. This continuous temperature reduction is necessary to remove latent heat of condensation and any heat gains in the entire system. A bypass line 24 is also shown as extending from the surge tank 15 to the spray liquid supply line 12 so that a part of the spray liquid can be bypassed around the condenser 5, cooler 21, this bypass line being shown as under control of a hand valve 25.

The water vapor entering the high vacuum vapor condenser 5 from its inlet 6 contacts with the low temperature sprays 9 and is condensed, the condensate being added to the spray liquid leaving the condenser through the outlet pipe 13. Accordingly, the spray liquid becomes progressively more dilute through the addition of the condensed water and in time would freeze at the low temperature which the cooler 21 maintains. To avoid this condition it is necessary to withdraw, either continuously or intermittently, a part of the spray liquid being circulated through the high vacuum condenser and cooler as above described, and to concentrate this withdrawn spray liquid and return it to the spray system for reuse. For this purpose a pipe 26 connects with the spray liquid pipe 12, the flow of liquid through this pipe being under control of a normally closed solenoid valve 27 which is opened in response to a rise of the liquid level in the surge tank 15 through a float switch 28 and control line 29. This pipe 26 conducts the dilute spray liquid to a concentrator indicated generally at 30.

The concentrator 30, as best shown in Fig. 2, is shown as comprising a concentrating tank 31 which is provided with a suitable thermo-insulating jacket and is shown as supported on legs 32. The top 33 of the concentrating tank supports a bubble column indicated generally at 34, this bubble column 34 acting in the manner of a fractionating tower to fractionally distill the waste vapors generated in the concentrating tank 31 so as to recover the higher boiling point antifreeze fraction used in the spray liquid and to return this higher boiling point fraction to the concentrating tank 31. This bubble column is shown as being in the form of a generally cylindrical shell 35 and as having a bottom wall or partition 36 which is in communication with the interior of the concentrating tank 31, a top wall 38, and a plurality of intermediate horizontal partitions 39, 40 and 41, these partitions dividing the bubble tower into four chambers 42, 43, 44 and 45.

The bottom wall or partition 36 and each of the partitions 39, 40 and 41 carries a central vertical waste vapor outlet pipe 46 which is in communication with the compartment arranged below its supporting partition and which is open at its upper end and extends into the compartment arranged above its supporting partition. Each of these waste vapor outlet pipes 46 is enclosed by a bubble head or cap 48 of any conventional form, these bubble heads or caps conducting the waste vapors downwardly to a level adjacent the partition or wall supporting the waste vapor outlet pipe 46 which the bubble head or cap surrounds. The waste vapor escaping from the lower rim of each bubble head or cap emerges to bubble upwardly through a body of liquor maintained in the bottom of each of the compartments 42, 43, 44 and 45. The body of liquid in the upper compartment 45 is maintained at a constant level by an overflow tube 50 which extends through the partition 39 and has its lower end immersed in the body of liquor maintained in the compartment 44. The body of liquid maintained in the compartment 44 is maintained at a constant level by an overflow pipe 51 which extends through the partition 40 and has its lower end immersed in the body of liquid maintained in the compartment 43. The body of liquid in the compartment 43 is maintained at a constant level by an overflow pipe 52 which extends through the partition 41 and has its lower end immersed in the body of liquid maintained in the compartment 42. The body of liquid in the compartment 42 is maintained at a constant level by an overflow pipe 53 which extends through the bottom wall 36 of the bubble column and has its lower end immersed in the body of liquor contained within the concentrating tank 31. The upper end of each of these overflow pipes is at such level that the lower part of the corresponding bubble head or cap 46 is submerged in a body of liquor.

The waste vapors from the upper chamber 45 of the bubble column escape through a waste vapor outlet pipe 56 and thence through the outer tube 58 of a waste vapor concentric tube vapor condensing coil 59, the condensate flowing from the lower end of the outer tube 58 through a pipe 60 into the bottom of an enclosed condensate tank 61. The condensate is shown as withdrawn from the bottom of this tank through a condensate outlet line 62 which connects with a condensate ejector 63 supplied with steam under pressure from a steam pipe 64.

To condense the waste vapor from the bubble column 34 the cooling medium supplied to the waste vapor concentric tube vapor condenser coil 59 must be at a comparatively low temperature. For this purpose the inner tube 65 of this waste vapor concentric tube condenser coil is supplied with a cooling medium, such as water.

The pipe 26 which conducts the dilute spray liquid to the concentrator is connected with the inner tube 66 of a concentric tube heat exchanger 67, the other end of this inner tube 66 connecting with a pipe 68 which extends upwardly along one side of the concentrating tank to discharge into the upper part of this concentrating tank. This discharge is under control of a control valve 72 which is set to control the amount of the feed of dilute liquid to give the most efficient performance of the concentrator. The outer tube of this concentric tube heat exchanger 67 conducts the hot concentrate from the concentrating tank 31 back to the spray system for reuse after being effectively cooled by the dilute low temperature liquid circulating in counterflow relation through the inner tube 66. For this purpose, an overflow pipe 75 connects with the upper end of the outer tube 73 and extends upwardly through the bottom of the concentrating tank 31. The upper end of this overflow pipe 75 is provided with a horizontally extending bend connected with a vertical equalizing pipe 76, the lower open end of which is submerged in the body of liquid contained within the concentrating tank 31, and the upper open end of which is arranged in the vapor space above this body. It will be seen that the bend of the overflow pipe 75 determines the level of the liquid maintained within the concentrating tank 31.

From the lower end of the outer tube 73 of the concentric tube heat exchanger, the concentrated liquid passes into a standpipe 80 which extends above the concentrating tank 31. At a point slightly below the level of the upper end of the overflow pipe 75, an inclined return pipe 81 connects with the standpipe 80, this return pipe 81 discharging the concentrated liquid by gravity into a strong liquor receiver 82. From this strong liquor receiver the concentrated spray liquid is returned through a line 83 to the surge tank 15 by a pump 84 under control of a normally closed solenoid valve 85. This solenoid valve is opened and the pump 84 is simultaneously started in response to a rise of the liquid level in the strong liquor receiver 82 through a float switch 86 and control lines 87 and 88.

The dilute liquid discharged into the concentrating tank 31 is heated by a coil 90 of any suitable form and supplied with a heating medium, such as water, from an inlet 91 extending through the shell of the concentrating tank 31. This hot water is supplied by a hot water pump 92 which withdraws hot water from a heater 93 through a line 94, three-way valve 95 and pump inlet line 96. This three-way valve 95 also connects with the line 98 connecting the hot water outlet 99 of the heating coil 90 with the water heater 93. The three-way valve 95 is under control of a thermostat 100, the sensitive parts of which are immersed in the liquid being concentrated in the concentrating tank 31, this thermostat 100 regulating the proportions of hot water supplied from the water heater 93 or from the outlet 99 of the coil 90 to the hot water pump 92 so as to provide the hot water at a temperature controlled in response to the temperature of the liquid within the concentrating tank 31. In addition, a bypass line 101 under control of a hand valve 102 is shown as provided between the water heater 93 and pump inlet and around the three-way control valve 95.

The water so recirculated through the water heater 93 can be heated in any suitable manner as by means of steam supplied from a steam line 104 past a steam regulating valve 105 to the inlet of the water heater 93, the condensate escaping through a condensate outlet line 106 and past a steam trap 108. The regulating valve 105 can be under control of a thermostat 109 responsive to the temperature of the hot water within the water heater 93 so that steam is supplied in the required amount so as to maintain the desired temperature of this water.

An important feature of the invention resides in maintaining substantially the same absolute pressure in the surge tank 15, strong liquor receiver 82, condensate tank 61, concentrating tank 31 and bubble tower 34 as well as the standpipe 80. It is an important feature of the invention, however, that the vacuum required to be maintained in these components of the concentrating apparatus need not be the low vacuum, such as the assumed absolute pressure of 0.0038 inch of mercury which is required to be maintained in the high vacuum dryer but can be a more practicable absolute pressure such as a 2 inch absolute pressure (about a 28 inch vacuum) which can be readily provided. This differential in absolute pressures between the vacuum dryer and the concentrating apparatus is permitted by the vertical liquid leg 14, the vertical extent or effective height of which corresponds to the difference in absolute pressures maintained in the vacuum dryer and in the concentrating apparatus. The provision of this liquid seal by the vertical leg 14 thereby permits the concentrating apparatus to be operated under moderate vacuum even though an extremely low absolute pressure is required in the vacuum dryer.

The moderate vacuum of the assumed 28 inches is supplied by a vacuum pump (not shown) connected to a vacuum line 110, this line being connected by a branch line 111 with the upper end head of the surge tank 15 and being connected by another branch line 112 with the upper extremity of the condensate tank 61. This upper extremity of the condensate tank is in turn connected to a vacuum line 114 having one branch 115 leading to a pressure equalizer header 116 and having another branch 118 leading to the upper end head of the strong liquor receiver 82. The pressure equalizer header 116 connects directly with the upper extremity of the standpipe 80. The pressure equalizer header also is connected to a vacuum line 119 which extends downwardy therefrom through the upper end head 33 of the concentrating tank 31 and has its lower end submerged in the body of liquid contained within this tank. This pressure equalizer header 116 is also connected with three vacuum lines 120, 121, 122 which extend upwardly alongside the bubble column 34 and which extend horizontally through the side of this bubble column and have their open lower ends submerged in the bodies of liquid contained within the chambers 42, 43 and 44. It will therefore be seen that a moderate vacuum, such as the assumed 28 inches, is maintained in the bubble tower 34, concentrating tank 31, condensate tank 61, strong liquor receiver 82 and surge tank 15, so that the liquid passing through all parts of the concentrating apparatus is maintained under substantially the same moderate vacuum.

*Operation*

In the operation of the apparatus as above described, it will be assumed that it is desirable to maintain an absolute pressure of 0.0038 inch of mercury in the vacuum dryer and for this purpose the spray liquid of suitable antifreeze characteristics is cooled to a leaving temperature of —45° F. in the cooler 21. It is also assumed that the vacuum line 110 maintains a moderate vacuum of 28 inches in the components with which it connects and that steam is supplied to the water heater 93. It is also assumed that cooling water is supplied to the waste vapor concentric tube condenser 59 arranged above the concentrating tank 31. Steam is also intermittently supplied to the condensate ejector 63.

Under these conditions the water vapor entering the high vacuum vapor condenser 5 through its inlet 6 from the vacuum dryer (not shown) encounters the sprays 9 of the spray liquid having an entering temperature of —45° F. and hence this water vapor is condensed at a temperature to maintain the desired approximate absolute pressure of 0.0038 inch of mercury in the vacuum dryer. This condensate mixes with the spray liquid and hence dilutes the same. The spray liquid so diluted with the condensate flows out through the outlet 13 from the vapor condenser down one side of the vertical liquid leg 14 and up the other side thereof into the horizontal run 16 and into the surge tank 15. In this surge tank the diluted spray liquid encounters a moderate vacuum of 28 inches maintained by the branch 111 which connects the upper end head of this surge tank with the vacuum line 110. In order to permit the flow of spray liquid by gravity from the vapor condenser 5 maintained at the low absolute pressure of 0.0038 inch of mercury into the surge tank 15 maintained at the moderate vacuum of 28 inches, the vertical liquid leg 14 is of such height as to correspond to this difference in the absolute pressures between the vapor condenser 5 and the surge tank 15.

From this surge tank 15 the spray liquid diluted by the condensate is withdrawn through the line 18 into the inlet of the circulating pump 19 which forces the liquid from its outlet line 20 through the shell and tube cooler 21 and thence into the spray liquid line 12 which returns it through the branches 11 and nozzles 10 to provide the sprays 9 in the vapor condenser 5. On passing through the cooler 21 the spray liquid is cooled to the assumed —45° F. by a cooling medium supplied to the cooler 21 thorugh the lines 22 and 23.

As the drying operation proceeds the spray liquid becomes progressively more dilute due to the addition of condensate from the vapors entering the vapor condenser 5. As this occurs the level in the surge tank 15 rises and lifts the ball float of the float switch 28. When this occurs an electrical circuit is completed through the control line 29 thereby opening the normally closed solenoid valve 27. This permits a flow of the dilute spray liquid through the concentrator, returning it to the strong liquor receiver 82 in a concentrated form.

In this flow the dilute spray liquid leaves the spray system through the line 26 past the now open solenoid valve 27 and into the inner tube 66 of the concentric tube heat exchanger 67. The dilute liquid leaves this inner tube 66 of this concentric tube heat exchanger coil through the line 68 and flows upwardly past the flow control valve 72 into the upper part of the concentrating tank 31 where it joins the body of liquid maintained in this concentrating tank. This body of liquid in this concentrating tank is heated by hot water supplied through the coil 90 immersed in this body of liquid. The heating medium is hot water supplied at a controlled temperature from the water heater 93, this water being circulated by the hot water pump 92 through the coil inlet 91, coil 90, coil outlet 99, line 98, hot water heater 93, line 94, three-way control valve 95 and line 96 to the inlet of the hot water pump 92. The temperature of the hot water so circulated by the hot water pump 92 is controlled in response to the temperature of the body of liquid maintained in the concentrating tank 31 by the thermostat 100 having its sensitive parts immersed therein and which controls the three-way valve 95 to control the proportioning of hot water so circulated through the hot water heater 93 in relation to the water supplied directly from the coil outlet 99 through the three-way valve 95 to the pump inlet line 96.

The temperature of the hot water in the hot water heater 93 is maintained at a constant temperature through a thermostat 109 immersed therein and controlling, through the regulator 105, the amount of steam admitted to this water heater 93 from a steam line 104.

The body of dilute liquid in the concentrating tank 31 boils and waste water vapor is evaporated therefrom. This water vapor flows upwardly through the bubble column 34, the waste vapor escaping from the concentrating tank through the waste vapor outlet pipe 46 mounted on the bottom wall or partition 36 of this bubble column and escaping under the corresponding bubble cap 48 and bubbling up through the body of liquid maintained in the lowest compartment of this bubble column by the overflow pipe 53, this overflow pipe returning the excess condensed liquid to the body of liquid maintained in the concentrating tank 31, the overflow being submerged therein. From the lowest compartment 42, the waste vapor passes upwardly through the successive compartments 43, 44, 45 of the bubble column, the waste vapor in each of these compartments bubbling up through the body of the liquid maintained in each of these compartments by the overflow pipes 52, 51 and 50, respectively, each of these overflow pipes returning the concentrate to the body of liquid in the next lower compartment and in which the lower ends of these overflow pipes are submerged. It will be seen that the bubble column 34 acts in the usual manner of a fractionating tower to prevent the escape of any substantial amounts of antifreeze with the waste water vapor leaving the upper compartment 45 through the water vapor outlet 56.

This waste vapor from the bubble column outlet 56 flows through the jacket 58 of the concentric tube waste vapor condensing coil 59, cooling water being circulated through the inner tube 65 of this condenser 59. On passing through this concentric tube waste vapor condenser 59 the waste vapor from the bubble column 34 is condensed and flows downwardly into the condensate tank 61 in the bottom of which the condensate collects. This condensate is removed intermittently through the pipe 62 by the condensate ejector 63 which is supplied with steam from the steam line 64.

The body of liquid within the concentrating tank 31 is accordingly concentrated in its antifreeze component and the concentrated or strong liquor escapes through the overflow bend at the upper end of the overflow pipe 75, this overflow bend being connected to the central part of the vertical equalizing pipe 76 which is open at both its upper and lower ends. This concentrated liquid from the overflow pipe 75 flows downwardly through the outer tube 73 of the concentric tube heat exchanger 67 thereby to be cooled by the dilute cold liquid entering the concentrating tank through its inner tube 66 and also to heat this incoming dilute liquid preparatory to its evaporation in the concentrating tank. From this outer tube 73 the concentrated liquid flows upwardly through the standpipe 80 to its inclined outlet 81. The strong or concentrated liquid flows downwardly by gravity through the pipe 81 into the strong liquor receiver 82. An increase of the liquid level in the strong liquor receiver 82 lifts the ball float of the float switch 86 thereby completing the electric circuits of both the pump 84 and the normally closed solenoid valve 85 through the control lines 87 and 88 thereby to start the pump 84 and to open simultaneously the solenoid valve 85. The strong liquor return pump 84 thereby moves the concentrated liquid through the line 83, past the now open solenoid valve 85 to the surge tank 15 where it rejoins the liquid being circulated through the high vacuum vapor condenser 5 and serves to build up the strength of the spray liquid to the point desired.

For the operation as above described, it is necessary to maintain a vacuum in all parts of the concentrating apparatus through which the spray liquid flows substantially equal to that maintained in the surge tank 15. For this purpose the vacuum line 110 maintains this vacuum in the condensate tank 28 through the branch vacuum line 112. Also for this purpose the same vacuum is maintained in the pressure equalizer header 116 and the strong liquor receiver 82 through the vacuum lines 114, 115 and 118 connecting with the condensate tank 61. The equalizer header in turn maintains substantially this same vacuum in the concentrating tank 31 through the vacuum line 119 having its lower end submerged in the body of liquid in the concentrating tank 31; in the stand pipe 80 through its direct connection therewith; and in each compartment 42, 43 and 44 of the bubble column 34 through the vacuum lines 120, 121 and 122 having their lower ends extending through the side of this bubble column 34 and each submerged in the body of liquid contained within the corresponding compartment.

From the foregoing it will be seen that the present invention provides a commercially practicable vacuum concentrator for maintaining the desired concentration of the antifreeze component in spray liquid used in the condenser serving a dryer or the like maintained at a very low absolute pressure and for which the spray liquid must be supplied at an extremely low temperature. It will also be seen that while a very low absolute pressure must be maintained in the vacuum dryer, only a moderate vacuum is required in the concentrating apparatus and at the same time equalization of pressures is achieved to insure trouble-free operation and gravity flow of the spray liquid from the low absolute pressure side of the apparatus to the higher absolute pressure side of the apparatus and through such parts of the concentrating apparatus where gravity flow is desirable.

I claim:

1. A concentrator for maintaining the strength of an antifreeze component of liquid serving an apparatus maintained at low absolute pressure, comprising an enclosed concentrating tank, a conduit conducting said liquid from said apparatus to said concentrating tank, said conduit being formed to provide a U-shaped liquid leg providing a liquid seal between said apparatus and said concentrating tank, means applying heat to the liquid in said concentrating tank to evaporate the same, a conduit returning the concentrated liquid from said concentrating tank to said apparatus, an ejector withdrawing the waste vapor generated in said concentrating tank and a vacuum line having an open end immersed in the body of liquid contained in said concentrating tank and maintained at a higher absolute pressure than said apparatus.

2. A concentrator for maintaining the strength of an antifreeze component of liquid serving an apparatus maintained at low absolute pressure, comprising an enclosed concentrating tank, a conduit conducting said liquid from said apparatus to said concentrating tank, said conduit being formed to provide a U-shaped liquid leg providing a liquid seal between said apparatus and said concentrating tank, means applying heat to the liquid in said concentrating tank to evaporate the same, a conduit returning the concentrated liquid from said concentrating tank to said apparatus, an enclosed bubble column arranged above and in communication with the waste vapor generated in said concentrating tank, said bubble column comprising a series of horizontal partitions dividing said bubble column into a vertical series of compartments, a vertical waste vapor pipe through each of said partitions and projecting upwardly into the compartment thereabove, a bubble cap over each of said waste vapor pipes and forcing the waste vapor passing through each compartment to bubble through the liquid collecting in the bottom thereof, and an overflow pipe through each of said partitions and having its lower end submerged in the body of liquid therebelow, said concentrator further comprising a waste vapor condenser communicating with the uppermost compartment of said bubble column, an ejector for the condensate from said waste vapor condenser, and a vacuum source maintained under a higher absolute pressure than said apparatus and having branches communicating, respectively, with said concentrating tank below the level of the liquid therein and with each of said compartments of said bubble column below the level of the liquid therein.

3. A concentrator for maintaining the strength of an antifreeze component of liquid serving an apparatus maintained at low absolute pressure, comprising an enclosed concentrating tank, a conduit conducting said liquid from said apparatus to said concentrating tank, said conduit being formed to provide a U-shaped liquid leg providing a liquid seal between said apparatus and said concentrating tank, means applying heat to the liquid in said concentrating tank to evaporate the same, an overflow pipe in said concentrating tank maintaining the level of the body of liquid in said concentrating tank and extending exteriorly thereof a standpipe connected with said overflow pipe, a return conduit connected with said standpipe below the level of the body of liquid in said concentarting tank and through which the concentrated liquid is returned to said apparatus, an ejector withdrawing the waste vapor generated in said concentrating tank, and a vacuum source maintained under higher absolute pressure than said apparatus and having branches communicating, respectively, with said concentrating tank below the level of the liquid therein and with the upper end of said standpipe.

4. A concentrator for maintaining the strength of an antifreeze component of liquid serving an apparatus maintained at low absolute pressure, comprising an enclosed concentrating tank, a conduit conducting said liquid from said apparatus to said concentrating tank, said conduit being formed to provide a U-shaped liquid leg providing a liquid seal between said apparatus and said concentrating tank, means applying heat to the liquid in said concentrating tank to evaporate the same, an overflow pipe in said concentrating tank maintaining the level of the body of liquid in said concentrating tank and extending exteriorly thereof, a standpipe connected with said overflow pipe, a return conduit connected with said standpipe below the level of the body of liquid in said concentrating tank and through which the concentrated liquid is returned to said apparatus, an enclosed bubble column arranged above and in communication with the waste vapor generated in said concentrating tank, said bubble column comprising a series of horizontal partitions dividing said bubble column into a vertical series of compartments, a vertical waste vapor pipe through each of said partitions and projecting upwardly into the compartment thereabove, a bubble cap over each of said waste vapor pipes and forcing the waste vapor passing through each compartment to bubble through the liquid collecting in the bottom thereof, and an overflow pipe through each of said partitions and having its lower end submerged in the body of liquid therebelow, said concentrator further comprising a waste vapor condenser communicating with the uppermost compartment of the bubble column, a condensate tank receiving the condensate from said waste vapor condenser, an ejector for the condensate in said condensate tank, and a vacuum source maintained under a higher absolute pressure than said apparatus and having branches communicating, respectively, with said concentrating tank below the level of the liquid therein, with each of said compartments of said bubble column below the level of the liquid therein, with said condensate tank, and with the upper end of said standpipe.

5. A concentrator for maintaining the strength of an antifreeze component of liquid serving an apparatus maintained at low absolute pressure, comprising an enclosed concentrating tank, a conduit conducting said liquid from said apparatus to said concentrating tank, said conduit being formed to provide a U-shaped liquid leg providing a liquid seal between said apparatus and said concentrating tank, means applying heat to the liquid in said concentrating tank to evaporate the same, an overflow pipe in said concentrating tank maintaining the level of the body of liquid in said concentrating tank and extending exteriorly thereof, a standpipe connected with said overflow pipe, a return conduit connected with said standpipe below the level of the body of liquid in said concentrating tank and through which the concentrated liquid flows by gravity, a strong liquor receiver at the lower end of said return conduit, a pump returning the liquid from said strong liquor receiver to said apparatus, an ejector withdrawing the waste vapor generated in said concentrating tank, and a vacuum source maintained under a higher absolute pressure than said apparatus and having branches communicating, respectively, with said concentrating tank below the level of the liquid therein, with the upper end of said standpipe, and with the upper part of said strong liquor receiver.

6. A concentrator for maintaining the strength of an antifreeze component of liquid serving an apparatus maintained at low absolute pressure, comprising an enclosed concentrating tank, a conduit conducting said liquid from said apparatus to said concentrating tank, said conduit being formed to provide a U-shaped liquid leg providing a liquid seal between said apparatus and said concentrating tank, means applying heat to the liquid in said concentrating tank to evaporate the same, an overflow pipe in said concentrating tank maintaining the level of the body of liquid in said concentrating tank and extending exteriorly thereof, a standpipe connected with said overflow pipe, a return conduit connected with said standpipe below the level of the body of liquid in said concentrating tank and through which the concentrated liquid flows by gravity, a strong liquor receiver at the lower end of said return conduit, a pump returning the liquid from said strong liquor receiver to said apparatus, an enclosed bubble column arranged above and in communication with the waste vapor generated in said concentrating tank, said bubble column comprising a series of horizontal partitions dividing said bubble column into a vertical series of compartments, a vertical waste vapor pipe through each of said partitions and projecting upwardly into the compartment thereabove, a bubble cap over each of said waste vapor pipes and forcing the waste vapor passing through each compartment to bubble through the liquid collecting in the bottom thereof, and an overflow pipe through each of said partitions and having its lower end submerged in the body of liquid therebelow, said concentrator further comprising a waste vapor condenser communicating with the uppermost compartment of the bubble column, a condensate tank receiving the condensate from said waste vapor condenser, an ejector for the condensate in said condensate tank, and a vacuum source maintained under higher absolute pressure than said apparatus and having branches communicating, respectively, with said concentrating tank below the level of the liquid therein, with each of said compartments of said bubble column below the level of the liquid therein, with said condensate tank, with the upper end of said standpipe, and with the upper part of said strong liquor receiver.

7. A concentrator for maintaining the strength of an antifreeze component of liquid serving an apparatus maintained at low absolute pressure, comprising an enclosed concentrating tank, a conduit conducting said liquid to said concentrating tank, said conduit being formed to provide a U-shaped liquid leg providing a liquid seal between said apparatus and said concentrating tank, means applying heat to the liquid in said concentrating tank to evaporate the same, a strong liquor receiver having an outlet, a conduit returning the concentrated liquid from said concentrating tank by gravity to said strong liquor receiver, means responsive to variations in the liquid level in said strong liquor receiver for controlling the discharge of strong liquor through said outlet, a conduit connecting said outlet with said apparatus for returning the concentrated liquid in said strong liquor receiver to said apparatus, means withdrawing the waste vapor generated in said concentrating tank, and means maintaining said concentrating tank and strong liquor receiver under a vacuum of higher absolute pressure than that maintained in said apparatus.

WALTER KALS.

References Cited in the file of this patent

UNITED STATES PATENTS

| Number | Name | Date |
|---|---|---|
| 631,958 | Dunham | Aug. 29, 1899 |
| 1,469,475 | Wirth-Frey | Oct. 2, 1923 |
| 1,508,130 | Sanger | Sept. 9, 1924 |
| 1,537,563 | Suczek | May 12, 1925 |
| 1,883,379 | Kermer | Oct. 18, 1932 |
| 1,996,526 | Serpas | Apr. 2, 1935 |
| 2,038,536 | Bulkeley | Apr. 28, 1936 |
| 2,129,299 | Bichowsky | Sept. 6, 1938 |
| 2,192,126 | Downs | Feb. 27, 1940 |
| 2,199,967 | Bichowsky | May 7, 1940 |
| 2,222,565 | Kraft | Nov. 19, 1940 |
| 2,225,959 | Miller | Dec. 24, 1940 |
| 2,241,114 | Brunjes | May 6, 1941 |
| 2,249,625 | Bichowsky | July 15, 1941 |
| 2,273,804 | Newton | Feb. 17, 1942 |
| 2,304,150 | Crawford | Dec. 8, 1942 |
| 2,400,138 | Buffington | May 14, 1946 |
| 2,402,401 | Hickman | June 18, 1946 |
| 2,631,018 | Kals | Mar. 10, 1953 |